United States Patent
Siddam et al.

(10) Patent No.: US 8,675,663 B2
(45) Date of Patent: Mar. 18, 2014

(54) METHOD FOR QOS AUTHORIZATION

(75) Inventors: Kalyan Premchand Siddam, Ottawa (CA); Haiqing Ma, Ottawa (CA); Xiong Xue, Ottawa (CA); David Huynh, Ottawa (CA); Fernando Cuervo, Ottawa (CA); Susan Patricia Ackerman, Ottawa (CA)

(73) Assignee: Alcatel Lucent, Paris (FR)

( * ) Notice: Subject to any disclaimer, the term of this patent is extended or adjusted under 35 U.S.C. 154(b) by 813 days.

(21) Appl. No.: 12/828,017

(22) Filed: Jun. 30, 2010

(65) Prior Publication Data

US 2012/0002540 A1  Jan. 5, 2012

(51) Int. Cl.
*H04L 12/28* (2006.01)
*H04L 1/00* (2006.01)
*H04J 3/18* (2006.01)
*G06F 15/173* (2006.01)
*G06F 15/16* (2006.01)

(52) U.S. Cl.
USPC ...... 370/395.21; 370/232; 370/236; 370/477; 709/226; 709/228

(58) Field of Classification Search
USPC .......... 370/229–230.1, 232–236, 395.2, 370/395.21, 477; 709/226, 228–229
See application file for complete search history.

(56) References Cited

U.S. PATENT DOCUMENTS

| | | | |
|---|---|---|---|
| 2008/0052258 A1* | 2/2008 | Wang et al. | 706/46 |
| 2008/0229385 A1* | 9/2008 | Feder et al. | 726/1 |
| 2009/0010156 A1* | 1/2009 | Song et al. | 370/230 |
| 2012/0059943 A1* | 3/2012 | Castro Castro et al. | 709/227 |
| 2012/0059944 A1* | 3/2012 | Fernandez Alonso et al. | 709/228 |
| 2012/0117235 A1* | 5/2012 | Castro Castro et al. | 709/224 |
| 2012/0144049 A1* | 6/2012 | Lopez Nieto et al. | 709/228 |

OTHER PUBLICATIONS

Universal Mobile Telecommunications System (UMTS); Policy and Charging Control over Gx Reference Point, 3GPP TS 29.212 Version 7.4.0 Release 7, pp. 1-44, Apr. 2008.*
3GPP TS 23.203, "3rd Generation Partnership Project; Technical Specification Group Services and System Aspects; Policy and Charging Control Architecture (Release 8)", V8.1.1, 2008.
ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 214, "Universal Mobile Telecommunications System (UMTS); LTE; Policy and Charging Control Over Rx Reference Point (3GPP TS 29.214 version 9.3.0 Release 9)", 2010.

* cited by examiner

*Primary Examiner* — Michael Thier
*Assistant Examiner* — Redentor Pasia
(74) *Attorney, Agent, or Firm* — Kramer & Amado, P.C.

(57) ABSTRACT

The invention is directed to providing a method and apparatus for authorizing Quality of Service (QoS) at a Policy and Charging Rules Function (PCRF) node in response to receiving a service request for a subscriber having a requested QoS, a QoS Negotiation Attribute Value Pair (AVP) and a QoS Upgrade AVP such that the QoS Negotiation AVP takes precedence over the QoS Upgrade AVP.

14 Claims, 4 Drawing Sheets

| Requested QoS 202 | SPR QoS 204 | QoS-Negotiation 206 | QoS-Upgrade 208 | Authorized QoS 210 | Comment |
|---|---|---|---|---|---|
| x+n Mbps | x Mbps | Supported | Not Supported | x Mbps | Requested bandwidth is more than the allowed. |
| x+n Mbps | x Mbps | Supported | Supported | x Mbps | QoS-Negotiation is the deciding attribute. QoS-Upgrade does not matter. |
| x+n Mbps | x Mbps | Not Supported | Not Supported | Rejected | Requested bandwidth is more than the allowed. |
| x+n Mbps | x Mbps | Not Supported | Supported | Rejected | QoS-Negotiation is not supported (i.e., requested should be returned as authorized or rejected). QoS-Upgrade does not matter. |
| x-n Mbps | x Mbps | Not Supported | Not Supported | x-n Mbps | Requested bandwidth is less than the allowed. QoS-Upgrade is not supported. |
| x-n Mbps | x Mbps | Supported | Not Supported | x-n Mbps | Requested bandwidth is less than the allowed. QoS-Upgrade is not supported. |
| x-n Mbps | x Mbps | Supported | Supported | x Mbps | Requested bandwidth is less than the allowed. QoS-Upgrade is supported, hence authorized BW upgraded to maximum allowed. |
| x-n Mbps | x Mbps | Not Supported | Supported | x-n Mbps | Requested bandwidth is less than the allowed. QoS-Negotiation is not supported (i.e., requested should be returned as authorized or rejected), QoS-Upgrade does not matter. |

Rows labeled 212, 214, 216, 218, 220, 222, 224, 226.

| Subscriber Bandwidth Limit in SPR | | Request message (CCR) | | | Answer message (CCA) | Comment |
|---|---|---|---|---|---|---|
| Max. allowed (Mbps) | Currently in-use (Mbps) | Requested bandwidth (Mbps) | QoS-Negotiation | QoS-Upgrade | Authorized bandwidth (Mbps) | |
| 10 | 7 | 5 | Supported | Not Supported | 3 | Requested + In-use bandwidth is more than the allowed. QoS-Negotiation is the deciding attribute. QoS-Upgrade does not matter. |
| 10 | 7 | 5 | Supported | Supported | 3 | |
| 10 | 7 | 5 | Not Supported | Not Supported | Rejected | Requested + In-use bandwidth is more than the allowed. QoS-Negotiation is not supported (i.e., requested should be returned as authorized). QoS-Upgrade does not matter. |
| 10 | 7 | 5 | Not Supported | Supported | Rejected | |
| 10 | 7 | 2 | Not Supported | Not Supported | 2 | Requested + In-use bandwidth is less than the allowed. QoS-Upgrade is not supported. |
| 10 | 7 | 2 | Supported | Not Supported | 2 | |
| 10 | 7 | 2 | Supported | Supported | 3 | Requested + In-use bandwidth is less than the allowed. QoS-Negotiation. QoS-Upgrade is supported, hence authorized bandwidth upgraded to maximum allowed. |
| 10 | 7 | 2 | Not Supported | Supported | 2 | Requested + In-use bandwidth is more than the allowed. QoS-Negotiation is not supported (i.e., requested should be returned as authorized). QoS-Upgrade does not matter. |

METHOD FOR QOS AUTHORIZATION

FIELD OF THE INVENTION

The invention is directed to packet switching communication networks, and in particular to authorizing Quality of Service (QoS) in 3GPP-compliant packet data networks.

BACKGROUND OF THE INVENTION

Long Term Evolution (LTE) is a new network scheme recommended by the 3rd Generation Partnership Project (3GPP). In an LTE network, all communications are carried over an IP channel from user equipment (UE) to an all-IP core called the Evolved Packet Core (EPC). The EPC then provides gateway access to other networks while ensuring an acceptable Quality of Experience (QoE) and charging a subscriber for their particular network activity.

The 3GPP generally describes the components of the EPC and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. The 3GPP specification allows the Policy and Charging Control (PCC) architecture to interwork with older generation networks (e.g., General Packet Radio Service (GPRS)). For example, 3GPP TS 29.212 and 3GPP TS 29.214 provide some guidance on the establishment of an application session by the EPC upon receipt of an application request from an Application Function (AF) in the form of an AA-Request (AAR) message or from a Packet Data Network Gateway (PGW) in the form of a Credit Control Request (CCR) message. The standards specify that the PCRF is responsible for receiving new service requests, creating new PCC rules commensurate with such requests, and providing these new PCC rules to a Policy and Charging Enforcement Function (PCEF) for installation. The 3GPP standards also define the format of service request messages and PCC rules.

The 3rd Generation Partnership Project (3GPP) Policy and Charging Control specifications provide a framework for authorizing Quality of Service (QoS) by Policy and Charging Rules Function (PCRF). These specifications provide QoS Negotiation and QoS Upgrade Attribute Value Pairs (AVPs) for negotiating and upgrading the QoS for General Packet Radio Service (GPRS) networks. The 3GPP specification suggests that the absence of QoS Negotiation AVP in the CCR indicates QoS negotiation supported and the absence of QoS Upgrade AVP in the CCR indicates QoS upgrade not supported. The 3GPP specifications are not complete and leave up to the reader the interpretation for implementation. For example, 3GPP specification does not specify if the QoS Negotiation and QoS Upgrade AVPs work in tandem or independently.

Therefore, a means of providing a deterministic way of calculating the authorized QoS is highly desirable.

SUMMARY OF THE INVENTION

Embodiments of the present invention provide a deterministic way of calculating the authorized QoS using various data points available at the PCRF (e.g., Requested QoS, User's subscription, Current bandwidth usage, etc. over on top of 3GPP specified QoS Negotiation AVP and QoS Upgrade AVP), such that QoS Negotiation AVP takes precedence over said QoS Upgrade AVP.

One aspect of the present invention is directed to a method for authorizing Quality of Service (QoS). The method comprises steps of: receiving a service request for a subscriber, the service request comprising a requested QoS, a QoS Negotiation Attribute Value Pair (AVP) and a QoS Upgrade AVP; retrieving from a Subscription Profile Repository (SPR), a QoS limit for the subscriber; and calculating an authorized QoS for the service request, wherein the QoS Negotiation AVP takes precedence over the QoS Upgrade AVP.

In some embodiments of the invention the step of calculating an authorized QoS further comprises steps of: determining if the requested bandwidth is greater than available bandwidth for the subscriber, defined as the QoS limit minus currently-used bandwidth for the subscriber; and if so, setting the authorized QoS for the service request to the available bandwidth for the subscriber if the QoS Negotiation AVP is set to QoS negotiation supported; otherwise rejecting the service request.

In some embodiments of the invention the requested bandwidth is not greater than the available bandwidth for the subscriber, then setting the authorized QoS to the available bandwidth for the subscriber only if the QoS Negotiation AVP is set to QoS negotiation supported and if the QoS Upgrade AVP is set to QoS Upgrade supported; otherwise setting the authorized QoS to the requested QoS.

In some embodiments of the invention the currently-used bandwidth for the subscriber comprises currently-used bandwidth for active PCC and/or QoS rules within an IP-CAN session of the subscriber.

In some embodiments of the invention the authorized QoS is communicated to a Policy and Charging Enforcement Function (PCEF).

Some embodiments of the invention further comprise a step of sending a Credit Control Answer (CCA) message in response to the service request.

In some embodiments of the invention the service request for a subscriber is received in the form of a Credit Control Request (CCR) message.

In some embodiments of the invention the method is performed at a Policy and Charging Rules Function (PCRF) node.

In some embodiments of the invention the PCRF node is a node or nodes providing PCRF functionality.

In some embodiments of the invention the PCRF node comprises an element in a 3GPP-compliant packet data network.

In some embodiments of the invention the 3GPP-compliant packet data network comprises a Long Term Evolution (LTE) or General Packet Radio Service (GPRS) network.

In some embodiments of the invention in which a specific Radio Access Type (RAT) with explicit upper bandwidth limit is used, the method further comprises a step of ensuring that the authorized QoS does not exceed a RAT-based upper limit.

Another aspect of the present invention is directed to a Policy and Charging Rules Function (PCRF) Node for a 3GPP-compliant packet data network the PCRF node configured to: receive a service request for a subscriber, the service request comprising a requested QoS, a QoS Negotiation Attribute Value Pair (AVP) and a QoS Upgrade AVP; retrieve from a Subscription Profile Repository (SPR), a QoS limit for the subscriber; and; calculate an authorized QoS for the service request; wherein the QoS Negotiation AVP takes precedence over the QoS Upgrade AVP.

Another aspect of the present invention is directed to a machine-readable storage medium encoded with instructions for a policy and rules charging function (PCRN) node, the machine-readable storage medium comprising: instructions for receiving a service request for a subscriber, the service request comprising a requested QoS (within the QoS Information AVP), a QoS Negotiation Attribute Value Pair (AVP) and a QoS Upgrade AVP; instructions for retrieving from a Subscription Profile Repository (SPR), a QoS limit for the subscriber; and instructions for calculating an authorized QoS for the service request, wherein the QoS Negotiation AVP takes precedence over the QoS Upgrade AVP.

BRIEF DESCRIPTION OF THE DRAWINGS

Some embodiments of apparatus and/or methods in accordance with embodiments of the present invention are now described, by way of example only, and with reference to the accompanying drawings in which:

FIG. 2 illustrates a table 200 describing the Authorized QoS 210 assigned according to an embodiment of the present invention;

FIG. 3 illustrates a table 300 with specific examples of inputs and the corresponding outputs of an embodiment of the present invention.

In the figures like features are denoted by like reference characters.

DETAILED DESCRIPTION

In 3GPP-compliant networks, data plane traffic is carried over virtual connections called service data flows (SDFs), which are, in turn, carried over IP-CAN bearers—virtual containers with unique QoS characteristics. Multiple SDFs can be carried per IP-CAN bearer. SDFs are also referred to as service flows or IP service flows. Each user equipment (UE) (e.g., a smart phone), requires a connection to the network. This connection to the network is represented as an IP-CAN session. Each IP-CAN session can carry one or more IP-CAN bearers.

Figure 1:
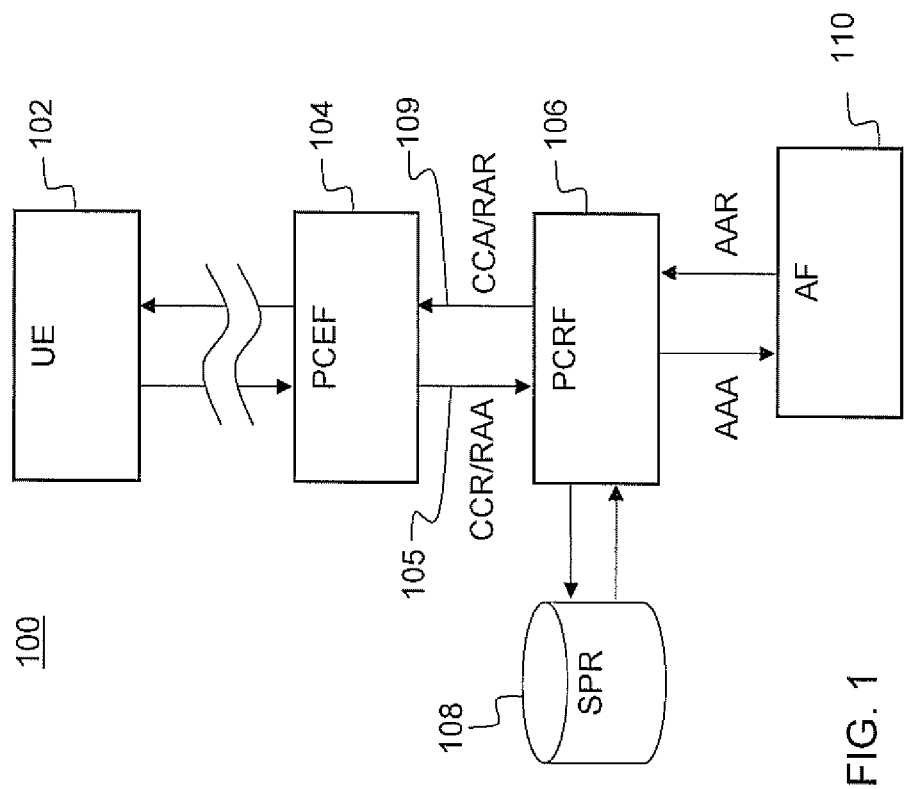
FIG. 1 illustrates a simplified block diagram of an LTE system.

FIG. 1 illustrates a simplified block diagram of an LTE system 100. User Equipment 102 communicates with a PCEF function 104, which can be part of a Packet Data Network-Gateway (PDN-GW) (also referred to as a packet gateway (PGW) node), to initiate a request for service. The PCEF generates a Credit Control Request (CCR) message, such as CCR 105, requesting an appropriate allocation of resources and forwards the request to PCRF node 106. The CCR message to PCRF node 106 includes an EPS-Default-Bearer-QoS Attribute Value Pair (AVP) or QoS Information AVP containing the requested QoS by the subscriber. PCRF validates the message (its syntax, semantics) and then retrieves subscriber data from Subscription Profile Repository (SPR) 108, to determine if the subscriber is valid, and the subscriber's QCI limit for the QCI specified in the request. Generally, the SPR 108 may store the following information, but not limited to, per subscriber, for non-Guaranteed Bit-Rate (non-GBR) calls: Aggregate Maximum Bit Rate (AMBR); the bandwidth limits for each non-GBR QCI; the bandwidth limits for a given application such as voice calls, Voice Over IP (VoIP) calls, or for specific applications such as, for example, Skype or Google Talk. The SPR 108 may be a device that stores information related to subscribers to the network 100. Thus, SPR 108 may include a machine-readable storage medium such as read-only memory (ROM), random-access memory (RAM), magnetic disk storage media, optical storage media, flash-memory devices, and/or similar storage media. SPR 108 may be a component of PCRF node 106 or may constitute an independent node within network 100. Data stored by SPR 108 may include an identifier of each subscriber and indications of subscription information for each subscriber such as bandwidth limits, charging parameters, subscriber priority, and subscriber service preferences.

Based on the event type (e.g., IP-CAN Session establishment, AF Session modification, etc.), the PCRF node 106 returns a Credit Control Answer (CCA) or Re-Authorization Request (RAR) message 109 to the PCEF 104 with the subscriber's QCI limit and authorization to establish or modify a service.

The 3GPP specifications suggest that the PCRF may provide the authorized QoS at the Internet Protocol Connectivity Access Network (IP-CAN) bearer level, at the QoS Class Identifier (QCI) level and the service flow level.

The QoS Negotiation AVP indicates if the PCRF can return the authorized QoS that is different from the requested QoS (i.e., user is willing to negotiate the QoS). The QoS Upgrade AVP indicates if the PCRF can return the authorized QoS that is higher than the requested QoS (i.e., user is willing to upgrade the QoS).

FIG. 2 illustrates a table 200 describing the Authorized QoS 210 assigned by the PCRF 106 according to an embodiment of the present invention, for various input scenarios for Requested QoS 202, QoS specified by the SPR (also referred to in this document as "SPR QoS" 204) for the specified QCI, QoS Negotiation AVP 206, QoS Upgrade AVP 208. The requested QoS 202 is also referred to as requested bandwidth 306 as shown in the table of FIG. 3 and is specified in megabits per second (Mbps). It is included in the CCR message 105 from PCEF 104. The SPR QoS is also referred to as Maximum allowed bandwidth 302 in FIG. 3. The QoS Negotiation AVP 206 (also shown as 308 in FIG. 3) and QoS Upgrade AVP 208 (also shown as 310 in FIG. 3) are included in the CCR message 105 from PCEF 104. The Authorized QoS 210 is also referred to as authorized bandwidth 312 as shown in FIG. 3 and is determined by the PCRF 106 and is incorporated in the CCA message built by the PCRF 106 to be sent to the PCEF 104 in the CCA answer message 109.

In embodiments of the present invention, if QoS negotiation is not supported, this means that the requested bandwidth should either be authorized or rejected.

If the requested QoS 202 (x+n Mbps) is greater than the SPR QoS 204 (x Mbps) as shown in rows 212, 214, 216, 218 of table 200 in FIG. 2, then QoS Negotiation is the deciding attribute and QoS Upgrade does not matter (i.e., no influence on the PCRF QoS authorization). If QoS negotiation is supported, then the authorized QoS is set to the SPR QoS (x Mbps). If QoS negotiation is not supported, then the authorized QoS is shown as "Rejected" in FIG. 2 which implies that the PCRF will reject the service request using a CCA message 109 to PCEF 104.

In cases where the requested QoS 202 (x−n Mbps) is less than the SPR QoS 204 (x Mbps) as shown in the rows 220, 222, 224, 226 of table 200 in FIG. 2, upgrading the QoS above that which was requested is only permitted if QoS Negotiation is also supported. Thus if both QoS Negotiation is supported and QoS Upgrade is supported, then QoS can be upgraded and the authorized QoS 210 is set to the SPR QoS 204 (x Mbps), otherwise the authorized QoS 210 is set to the Requested QoS 202 (x−n Mbps).

Note that the subscriber's current bandwidth used is not discussed in FIG. 2 but is also a parameter that the PCRF 106 takes into account when determining the Authorized QoS 210. It will be discussed in more detail with reference to FIG. 3. For the purposes of understanding the table in FIG. 2, the subscriber's current bandwidth used may be assumed to be zero.

To further illustrate aspects of an embodiment of the invention, referring to FIG. 3, table 300 provides specific examples of inputs and the corresponding outputs of an embodiment of the present invention. In the example of table 300, the subscriber bandwidth limit in SPR 302 as determined by QoS limit assigned to the subscriber in SPR 108 is set to 10 Mbps. The bandwidth currently in use 304 by the subscriber is set to 7 Mbps. The requested bandwidth 306 is set to 5 Mbps in rows 314, 316, 318, 320 of table 300. Thus the requested bandwidth plus the bandwidth already in-use by the subscriber exceeds the maximum allowed bandwidth and QoS negotiation is necessary to allow the service request. QoS Negotiation 308 is the determining factor and if it is supported, the authorized bandwidth 312 is determined by subtracting the currently in-use bandwidth 304 from the maximum allowed bandwidth 302 to determine the available bandwidth which in the case of the first four rows of table 300 is 3 Mbps. Thus in rows 314, 316 of table 300, the authorized bandwidth 312 is set to 3 Mbps which is included in the CCA answer message to be sent to the PCEF 104. If QoS Negotiation 308 is not supported, then the service request is rejected as indicated by answer message 312 set to "rejected" in rows 318, 320 of table 300.

In rows 322, 324, 326, 328 of table 300, the requested bandwidth 306 is set to 2 Mbps; thus the requested bandwidth 306 (5 Mbps) plus the bandwidth already in-use 304 (7 Mbps) by the subscriber is less than the maximum allowed bandwidth 302 (10 Mbps). Upgrading the QoS above that which was requested is only permitted if QoS Negotiation is also supported. Thus if both QoS Negotiation is supported and QoS Upgrade is supported, as is the case for row 326 of table 300 then QoS can be upgraded from the request 2 Mbps to the 3 Mbps that is available (10 Mbps allowed minus 7 Mbps in-use), and the authorized bandwidth 312 to be included in the CCA answer 109 message is set to 3 Mbps.

Figure 4:
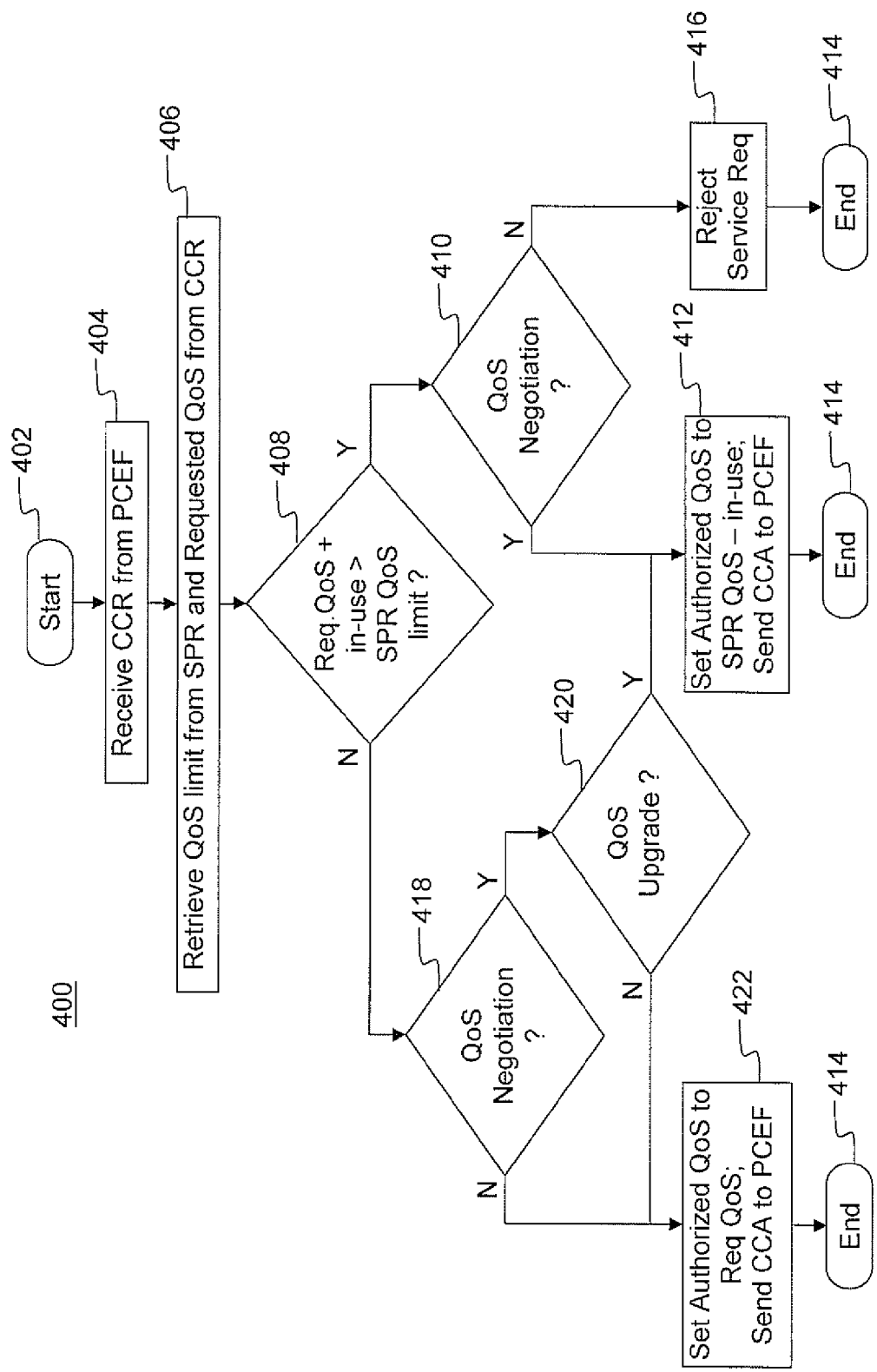
FIG. 4 illustrates a flowchart of a method of an embodiment of the present invention.

FIG. 4 illustrates a flowchart of a method 400 of an embodiment of the present invention. The process starts at step 402. At step 404, the PCRF 106 receives a CCR message 105, representing a service request for a UE 102, from PCEF 104. The request for service could originate from the UE 102 or from the AF 110. The CCR 105 message contains a QoS Information AVP which includes QCI, MBR for upload and download, GBR for upload and download, QoS Negotiation AVP, QoS Upgrade AVP. At step 406, the PCRF 106 extracts subscriber data from the SPR 108, including the QoS limit for the QCI from the SPR and the requested QoS from the CCR message 105.

At step 408, the PCRF 106 determines if the requested QoS plus the bandwidth already in-use by the subscriber is greater than the QoS limit retrieved from the SPR 108 and if so, the process continues to step 410.

At step 410, the PCRF 106 determines if the QoS Negotiation AVP is set. Note that the QoS negotiation AVP takes precedence over the QoS Upgrade AVP, therefore the QoS Upgrade AVP has no effect on the decision at this branch of the process. If the QoS Negotiation AVP is set to QoS negotiation supported, the process proceeds to step 412 where the PCRF 106 calculates the Authorized QoS and sets the Authorized QoS for the service request to available bandwidth for the subscriber which is determined as the QoS limit specified in the SPR 108, minus the bandwidth already in-use by the subscriber. The PCRF 106 sends CCA message to the PCEF 104, specifying the Authorized QoS. The process then ends at step 414.

Note that certain Radio Access Type (RAT) types can have an explicit upper bandwidth limit. For example, in GSM EDGE Radio Access Networks (GERAN)), the most a GERAN IP-CAN bearer can carry is 473.6 Kbps. In such cases, the PCRF also ensures that the authorized QoS does not exceed the RAT based upper limit.

If at step 410, the PCRF 106 determines that the QoS Negotiation AVP is not set, then the PCRF 106 sends CCA message 109 to the PCEF 104, rejecting the service request (received as CCR message 105). The process then ends at step 414.

If at step 408, the PCRF 106 determines that the requested QoS plus the bandwidth already in-use by the subscriber is not greater than the QoS limit retrieved from the SPR 108, the process proceeds to step 418 where the PCRF 106 determines if the QoS Negotiation AVP is set to QoS negotiation supported and if so, the process proceeds to step 420.

At step 420, the PCRF 106 determines if the QoS Upgrade AVP is set to QoS upgrade supported and if so, the requested QoS can be upgraded from the requested QoS to the QoS limit. The process therefore proceeds to step 412 described above.

If at step 420, the PCRF 106 determines that the QoS Upgrade AVP is set to QoS upgrade not supported, then the process proceeds to step 422, where the PCRF 106 sets the Authorized QoS to the QoS requested from the CCR message 105. The PCRF 106 sends CCA message 109 to PCEF 104, specifying the Authorized QoS. The process then ends at step 414.

If at step 418, the PCRF 106 determines that the QoS Negotiation AVP is set to no QoS negotiation, then the process also proceeds to step 422 described above.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method for authorizing Quality of Service (QoS), the method comprising:
    receiving a service request for a subscriber, the service request comprising a requested QoS, a QoS Negotiation Attribute Value Pair (AVP), and a QoS Upgrade AVP;
    retrieving from a Subscription Profile Repository (SPR), a QoS limit for the subscriber;
    calculating an authorized QoS for the service request based upon the requested QoS and the QoS limit;
    determining whether both the QoS Negotiation AVP and the QoS Upgrade AVP are supported; and
    upgrading to the authorized QoS when both the QoS Negotiation AVP and the QoS Upgrade AVP are supported.

2. The method of claim 1, wherein the step of calculating an authorized QoS further comprises:
    determining if a requested bandwidth is greater than an available bandwidth for the subscriber, defined as the QoS limit minus currently-used bandwidth for the subscriber; and if so,
    setting the authorized QoS for the service request to the available bandwidth for the subscriber if the QoS Negotiation AVP is set to QoS negotiation supported; and
    otherwise rejecting the service request.

3. The method of claim 2, wherein if the requested bandwidth is not greater than the available bandwidth for the subscriber, then setting the authorized QoS to the available bandwidth for the subscriber only if the QoS Negotiation AVP is set to QoS negotiation supported and if the QoS Upgrade AVP is set to QoS Upgrade supported; and otherwise setting the authorized QoS to the requested QoS.

4. The method of claim 2, wherein the currently-used bandwidth for the subscriber comprises currently-used bandwidth for active PCC and/or QoS rules within an IP-CAN session of the subscriber.

5. The method of claim 1, wherein the authorized QoS is communicated to a Policy and Charging Enforcement Function (PCEF).

6. The method of claim 2, further comprising:
    sending a Credit Control Answer (CCA) message in response to the service request.

7. The method of claim 2, wherein the service request for a subscriber is received as a Credit Control Request (CCR) message.

8. The method of claim 7, further comprising:
    performing the method at a Policy and Charging Rules Function (PCRF) node.

9. The method of claim 8, wherein the PCRF node is a node or nodes providing PCRF functionality.

10. The method of claim 9, wherein the PCRF node comprises an element in a 3GPP-compliant packet data network.

11. The method of claim 10, wherein the 3GPP-compliant packet data network comprises either a Long Term Evolution (LTE) or General Packet Radio Service (GPRS) network.

12. The method of claim 1, further comprising:
    using a specific Radio Access Type (RAT) with an explicit upper bandwidth limit; and
    ensuring that the authorized QoS does not exceed the explicit upper bandwidth limit.

13. A method of using a Policy and Charging Rules Function (PCRF) Node for a 3GPP-compliant packet data network, the method comprising:
    receiving a service request for a subscriber, the service request comprising a requested QoS, a QoS Negotiation Attribute Value Pair (AVP), and a QoS Upgrade AVP;
    retrieving from a Subscription Profile Repository (SPR), a QoS limit for the subscriber; and
    calculating an authorized QoS for the service request based upon the requested QoS and the QoS limit;
    determining whether both the QoS Negotiation AVP and the QoS Upgrade AVP are supported; and
    upgrading to the authorized QoS when both the QoS Negotiation AVP and the QoS Upgrade AVP are supported.

14. A non-transitory storage medium encoded with instructions for a policy and rules charging function (PCRF) node, the non-transitory storage medium comprising:
    instructions for receiving a service request for a subscriber, the service request comprising a requested QoS, a QoS Negotiation Attribute Value Pair (AVP), and a QoS Upgrade AVP;
    instructions for retrieving from a Subscription Profile Repository (SPR), a QoS limit for the subscriber; and
    instructions for calculating an authorized QoS for the service request based upon the requested QoS and the QoS limit;
    instructions for determining whether both the QoS Negotiation AVP and the QoS Upgrade AVP are supported; and
    instructions for upgrading to the authorized QoS when both the QoS Negotiation AVP and the QoS Upgrade AVP are supported.

* * * * *